United States Patent [19]

Wilson

[11] Patent Number: 4,482,655

[45] Date of Patent: Nov. 13, 1984

[54] COMMINUTED INORGANIC MATERIALS

[75] Inventor: Michael E. Wilson, Inman, S.C.

[73] Assignee: Milliken Research Corporation, Spartanburg, S.C.

[21] Appl. No.: 296,389

[22] Filed: Aug. 26, 1981

Related U.S. Application Data

[62] Division of Ser. No. 157,880, Jun. 9, 1981, Pat. No. 4,328,041.

[51] Int. Cl.$^3$ .............................................. C08K 5/09
[52] U.S. Cl. ................................... 523/200; 106/176; 106/241; 523/202; 523/212; 523/216; 524/209; 524/212; 521/76; 521/90
[58] Field of Search ...................... 523/200, 202, 212; 524/209, 212; 106/176, 241, 308 Q

[56] References Cited

U.S. PATENT DOCUMENTS 4,159,312 6/1979 Shibazaki et al. ................... 106/306

FOREIGN PATENT DOCUMENTS 2816381 10/1978 Fed. Rep. of Germany ...... 106/306

Primary Examiner—Lewis T. Jacobs
Attorney, Agent, or Firm—H. William Petry; Terry T. Moyer

[57] ABSTRACT

According to the present invention a composition of matter is provided comprising the reaction product of a comminuted inorganic material and a substituted succinic anhydride having the formula:

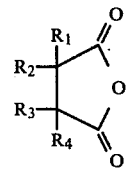

wherein at least one of $R_1$, $R_2$, $R_3$ and $R_4$ is a substituent selected from alkyl, alkenyl, alkynyl or aralkyl group having from 1 to about 30 carbon atoms or a substituted derivative thereof, and the remaining substituents are hydrogens. The substituent may be saturated or unsaturated, linear or branched, and may have from 1 to about 10 substitutions including halogen, tertiary amino, tertiary amide, ketal, episulfide, sulfonate, phosphonate, imide, carboxylate, carbonate, isocyanate, silane, epoxy, cyano, ether, thioether, carbonyl, aromatic nitro, or acetal. In a particular molecule, all of the $R_1$, $R_2$, $R_3$ and $R_4$ groups may be the same or different, so long as they fall within the above class.

5 Claims, No Drawings

COMMINUTED INORGANIC MATERIALS

This is a division of application Ser. No. 157,880, filed June 9, 1980, now U.S. Pat. No. 4,328,041, issued May 4, 1982.

The present invention relates to comminuted inorganic materials which have been treated with a substituted succinic anydride. The present invention also relates to filled polymeric compositions wherein the filler has been treated with a substituted succinic anhydride prior to incorporation into the polymer.

Inorganic materials have long been used as fillers, pigments, reinforcements and chemical reactants in polymers. In general, these inorganic materials are hydrophilic, that is, easily wetted by water or able to absorb water, but their compatibility with organic polymers is limited. Because of this limited compatibility, the full potential of color, reinforcement, or chemical reactivity of the inorganic materials is not realized.

To overcome these difficulties, wetting agents have been used to minimize interfacial tension; but wetting agents, too, have serious deficiencies. In particular, relatively large proportions are necessary to produce adequate wetting of the finely divided inorganics. When used in large proportions, the wetting agents markedly detract from the properties of the finished composite.

Coupling agents have been developed to overcome this difficulty. Coupling agents are used as a surface treatment for fillers to enhance the interaction of the polymers with the fillers, and thus improve the physical properties of the product. The coupling agent may be physisorbed, chemisorbed, ionically bound or covalently bound to the filler surface. The interaction with the polymer may be covalent, polar, van der Waals, or chain entanglement. Typical effects of coupling agents are reduced viscosity of the filled polymer system, better dispersion of the fillers, higher impact, flexural and tensile strength, and better surface appearance of the filled product. They frequently make possible higher filler loadings without the associated processing troubles and property losses.

Known coupling agents fall into two general classes. The first, the more widely used, is trialkoxy organo functional silanes. Their activity is based upon chemical interaction between the alkoxy portion of the silane and filler and the chemical reaction of the organo functional portion with the polymer matrix. This provides a direct chemical link between the polymer and filler. Their principal area of use has been in glass filler reinforcement applications, particularly for polyester and rubber, and they perform relatively well in glass-filled systems. Silanes, however, have drawbacks. They are relatively expensive, and they are typically highly flammable, difficult to handle, and not easily worked into many polymer systems. Where the polymers do not contain functional groups or where the filler does not contain acidic protons, the silanes are often ineffective because of their inability to interact. For example, silanes are ineffective in the thermoplastic hydrocarbons and with fillers such as carbon black, and to a large degree calcium carbonate and sulfur.

The second group of coupling agents includes the organotitanates which may be prepared by reacting tetraalkyl titanates with aliphatic or aromatic carboxylic acids. Of particular interest are the di- or trialkoxy acyl titanates or certain alkoxy triacyl titanates. These titanates, however, have serious drawbacks. Frequently their effects may not be uniform in different polymer systems so that experimentation may be required among several titanates to discover the appropriate coupling agent for a given system. They also tend to decompose at temperatures frequently used in preparing many polymers; they tend to discolor certain inorganic materials used with polymer systems; and they are not compatible with many polymer systems.

Accordingly, the present invention provides new coupling agents which are easily prepared from readily available starting materials and which may provide improved compatibility between inorganic filler materials and organic polymers. Such improved compatibility may result in part from the ability of the anhydride moiety to scavange water from the surface of the filler so that the resulting diacid binds tightly onto the filler. Because of such improved compatibility, improved color potential, reinforcement and chemical reactivity of the inorganic filler materials may be realized. The new coupling agents of the present invention may not detract from the properties of the finished composite and in fact they may actually serve to improve the physical properties of the product by, for instance, enhancing the interaction of the polymers with the fillers. The coupling agents used in the preparation of the compositions of the present invention may be easily handled, and may also be easily worked into many polymer systems. The coupling agents used in the compositions of the present invention may be employed even where the polymer system does not contain functional groups, e.g., in thermoplastic hydrocarbons or where the filler does not contain acidic protons, e.g., carbon black, calcium carbonate and even sulfur. The coupling agents used in the compositions of the present invention are compatible with a wide variety of polymer systems and may provide a more uniform effect than many of the known titanate coupling agents. They are relatively stable at the temperatures used to prepare the polymer; and they generally do not discolor the inorganic materials used with the polymer systems.

According to the present invention a composition of matter is provided comprising the reaction product of a comminuted inorganic material and a substituted succinic anhydride having the formula:

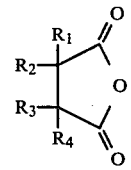

wherein at least one of $R_1$, $R_2$, $R_3$ and $R_4$ is a substituent selected from alkyl, alkenyl, alkynyl or aralkyl group having from 1 to about 30 carbon atoms or a substituted derivative thereof, and the remaining substituents are hydrogens. The substituent may be saturated or unsaturated, linear or branched, and may have from 1 to about 10 substitutions including halogen, tertiary amino, tertiary amide, ketal, episulfide, sulfonate, phosphonate, imide, carboxylate, carbonate, isocyanate, silane, epoxy, cyano, ether, thioether, carbonyl, aromatic nitro, or acetal. In a particular molecule, all of the $R_1$, $R_2$, $R_3$ and $R_4$ groups may be the same or different, so long as they fall within the above class.

While a wide variety of substituents described herein may be employed, the most suitable may depend upon the filler/polymer system and to a lesser extent upon the curative and/or extender systems employed. It is preferred, however, that the substituent be alkenyl having 1 to about 22 carbon atoms, e.g., hexenyl, octenyl, dodecenyl and octadecenyl. Such compounds are provided with an olefinic bond which may be capable of reacting with the polymer into which the filler is incorporated.

Halo-substituted groups which may be employed include, for example, bromohexyl. One or more halogen atoms may be present, such as for example difluorohexyl or tetrabromooctyl. Ester substituted aryl and alkyl groups include 4-carboxyethylcapryl and 3-carboxymethyl toluyl.

In addition to the foregoing aliphatic groups, groups containing hetero-atoms, such as oxygen, sulfur or nitrogen, in the chain may also be used. Examples of these radicals are ethers of the alkoxyalkyl type, including methoxyhexyl and ethoxydecyl. Alkylthioalkyl groups include methylthiododecyl groups. Tertiary amines may also serve as the terminal portion of the hydrophobic group.

The aryl groups include the phenyl and naphthyl groups and substituted derivatives. Substituted alkyl derivatives include toluyl, xylyl, pseudocumyl, mesityl, isodurenyl, durenyl, pentamethylphenyl, ethylphenyl, n-propylphenyl, cumyl, styryl, allylphenyl, nitro- and halo-substituted may be exemplified by chloronitrophenyl, chlorodinitrophenyl, dinitrotoluol, and trinitroxylyl.

Substituted naphthyl groups include nitronaphthyl, chloronaphthyl and carboxynaphthyl groups.

Halo-substituted aryl groups include fluoro-, chloro-, bromo-, iodophenyl, chlorotoluyl, bromotoluyl, methoxybromophenyl, dimethylaminobromophenyl, trichlorophenyl, bromochlorophenyl, and bromoiodophenyl.

Groups derived from aromatic carboxylic acids are also useful. These include methylcarboxylphenyl, dimethylaminocarboxyltoluyl, laurylcarboxyltoluyl and nitrocarboxyltoluyl.

Additional suitable groups include all oil epoxides (a mixture of from about 6 to about 22 carbon alkyl groups) containing an average of one epoxy group per molecule and glycidyl ethers of lauryl or stearyl alcohol.

Examples of the substituted succinic anhydrides of the invention include: dodecenylsuccinic anhydride (DDSA), octadecenylsuccinic anhydride (ODSA), and 1,4,5,6,7,7,-hexachloro-5-norbornene-2,3-dicarboxylic anhydride.

The substituted succinic anhydrides of the present invention may be easily prepared by reacting maleic anhydride with a conjugated diene by what is known as a Diels-Alder reaction (see, for instance, equation 1 below).

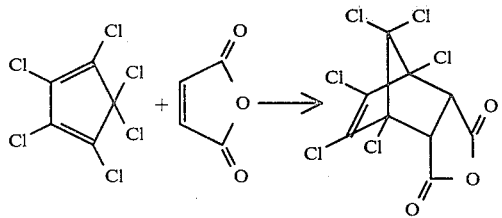

Alternatively the anhydrides may be prepared by the reaction of maleic anhydride with α-methylene olefins, known as the "ene" reaction (see, for instance, equation 2 below).

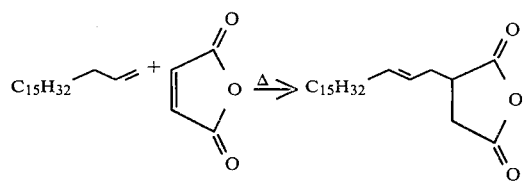

The corresponding alkyl-substituted succinic anhydrides may be prepared by reacting the ethylenically unsaturated products produced by either of the above reactions with hydrogen to provide the corresponding alkyl-substituted compounds. The preferred coupling agents of the present invention, namely octadecenylsuccinic anhydride and dodecenylsuccinic anhydride may be conveniently prepared via reaction 2 above from 1-octadecene and propylene tetramer (a mixture of isomers).

The composition of matter of the present invention comprises the reaction products of the aforesaid classes of substituted succinic anhydrides with inorganic materials. The amount of the substituted succinic anhydride reacted may be at least 0.01 part, preferably from 0.1 to 5 parts, and most preferably between 0.2 and 2 parts, per 100 parts of inorganic solid. The optimum proportions required may be a function of the inorganic solid and the substituted succinic anhydride selected, and the degree of the comminution, i.e., the effective surface area, of the inorganic solid. The reaction of the substituted succinic anhydride may take place on the surface of the inorganic filler. The anhydride moiety may scavange advantageous water from the filler surface, and the resulting diacid may bind tightly to reactive sites on the surface of the filler, or the anhydride may bind covalently with free hydroxyl groups on the mineral surface forming a hydrophobic surface layer on the inorganic solid. The unmodified inorganic solid may be difficult to disperse in an organic medium because of its hydrophilic surface. The substituted succinic anhydride compound may be incorporated into an organic medium (low molecular weight liquids or higher molecular weight polymeric solids) with the inorganic solid prior to reaction with the inorganic solid if the substituted succinic anhydride and organic medium are compatible. Alternatively, the substituted succinic anhydride may be first reacted with the inorganic solid in the absence of an organic medium and thereafter admixed with the latter.

By means of the present invention, the dispersion of inorganic materials in organic polymer media, such as, for instance, nonprotic plastics, say polyethylene, polypropylene and polyvinyl chloride is improved as evidenced by a substantially reduced viscosity of the filled polymer system. Additional advantages which may be achieved include: (1) improved rheology or higher loading of the dispersate in the organic medium; (2) higher degrees of reinforcement by the use of fillers, thereby resulting in improved physical properties in the filled polymer; (3) more efficient use of pigments and opacifiers; (4) higher inorganic-to-organic ratios in a dispersion; and (5) shorter mixing times to achieve dispersion.

Also, according to the invention herein, the reaction with a substituted succinic anhydride may be carried out neat or in an organic medium to form a liquid, solid, or pastelike solid dispersion which can be used in the compounding of the final polymeric system. Such dispersions are very stable, i.e, having little tendency to settle, separate, or harden on storage to a non-dispersible state.

Moreover, the invention may simplify the making of inorganic dispersions in organic media by providing a means to eliminate the solvent, to reduce the cost of processing equipment, and to reduce the time and energy required to disperse an inorganic solid material in a liquid or polymeric organic solid. The present invention may also result in the formation of a reinforced polymer which has a lower melt viscosity, improved physical properties, and better pigmenting characteristics than the prior art materials.

The practice of the present invention may achieve a product comprising natural or synthetic polymers which may contain particulate or fibrous inorganic materials which reinforce, pigment or chemically react with the polymer to produce a product having superior physical properties, better processing characteristics and more efficient utilization of pigments.

Among the advantages gained by the practice of this embodiment of the present invention is the option of dispensing with the use of volatile and flammable solvents and the attendant need to dry the filler or to recover solvents. Also, the dispersions of the present invention are non-oxidizing.

The inorganic materials may be particulate or fibrous and of varied shape or size, so long as the surfaces are reactive with the substituted succinic anhydride compound. Examples of inorganic reinforcing materials include metals, clay, carbon black, calcium carbonate, barium sulfate, silica, mica, glass and asbestos. Reactive inorganic materials include the metal oxides of zinc, magnesium, lead, and calcium and aluminum, iron filings and turnings, and sulfur. Examples of inorganic pigments include titanium dioxide, iron oxides, zinc chromate, ultramarine blue. As a practical matter, the particle size of the inorganic materials should not be greater than 1 mm, preferably from 0.1 micron to 500 micron. The substituted succinic anhydride should be properly admixed with the inorganic material to permit the surface of the latter to react sufficiently. The optimum amount of the substituted succinic anhydride to be used is dependent on the effect to be achieved, the available surface area of and the bonded water in the inorganic material.

Reaction is facilitated by admixing under the proper conditions. Optimum results depend on the properties of the substituted succinic anhydride. The particle size, the geometry of the particles, the specific gravity, the chemical composition, among other things, must be considered. Additionally, the treated inorganic material must be thoroughly admixed with the polymeric medium. The appropriate mixing conditions depend on the type of polymer, whether it is thermoplastic or thermosetting, its chemical structure, etc., as will be readily understood by those skilled in the art.

Where the inorganic material is pretreated with the substituted succinic anhydride it may be admixed in any convenient type of intensive mixer, such as a Henschel or Hobart mixer or a Waring blender. Even hand mixing may be employed. The optimum time and temperature are determined to obtain substantial reaction between the inorganic material and the succinic anhydride. Mixing may, for instance, be accomplished by dissolving the coupling agent in a solvent and adding the desired filler to it. Then after stirring for a period of time sufficient for reaction to occur between the filler and the substituted succinic anhydride, e.g., at least about one hour, at a temperature which may be between about room temperature and reflux, the solvent may be stripped and the product may then be dried at an elevated temperature, e.g., about 50° C. to 200° C., until it is dry, e.g., about 15 minutes to 5 hours. Several other methods may also be suitable. For instance, the coupling agent may be diluted with plasticizer or mineral oil and then coated onto the filler in an agitated bed, e.g., high shear mixer. Application of the substituted succinic anhydride to certain fillers may be simply accomplished in water with heating and thorough drying of the product. In the latter instance the anhydride may hydrolyze to the diacid which would adhere to fillers with a basic surface. Additional methods may be apparent to those skilled in the art based upon the above disclosed techniques. While it is desirable that the bulk of the reactive groups on the substituted succinic anhydride be reacted during the pretreatment step, this is not essential where the materials are later admixed with a polymer, since the substantial completion of the reaction may take place in this later mixing step.

Polymer processing, e.g., high shear mixing, is generally performed at a temperature well above the second order transition temperature of the polymer, desirably at a temperature where the polymer will have a low melt viscosity. For example, low density polyethylene is best processed at a temperature range of 170° to 230° C.; high density polyethylene from 200° to 245° C.; polystyrene from 230° to 260° C.; and polypropylene from 230° to 290° C. Temperatures for mixing other polymers are known to those skilled in the art and may be determined by reference to existing literature. A variety of mixing equipment may be used, e.g., two-roll mills, Banbury mixers, double concentric screws, counter or co-rotating twin screws and ZSK type of Werner and Pfaulder and Busse mixers.

When the substituted succinic anhydride and the inorganic materials are dry-blended, thorough mixing and/or reaction is not readily achieved and the reaction may be substantially completed when the treated filler is admixed with the polymer. In this latter step, the substituted succinic anhydride may also react with the polymeric material if one or more of the $R_1$, $R_2$, $R_3$ and $R_4$ groups is reactive with the polymer.

To illustrate further the invention, attention is directed to the following examples where unless otherwise indicated parts and percentages refer to parts and percentages by weight. It is to be understood that the examples are not to be construed as limiting the invention, defined in the claims, in any way, but are for illustrative purposes only.

EXAMPLE 1

Preparation of Dodecenylsuccinic Anhydride (DDSA)

Eleven hundred and ten grams (6.6 moles) of propylene tetramer and 430 grams (4.4 moles) of maleic anhydride were placed in a 2 liter stirred autoclave equipped with a thermocouple. The reaction was carried out by heating the mixture at 225° C. for 3 hours, and the cooled product was transferred to a 2 liter round bottom flask equipped with a magnetic stir bar, a thermometer, and a distilling head mounted on a Vigreux Column. Unreacted starting materials were removed at ~200° C. and 10 torr, followed by distillation of DDSA at 180°–240° C. (10 torr). The final product (590 grams) was a pale yellow oil with a specific gravity of 1.00 g/ml and strong adsorption in its IR spectrum at 1860 and 1780 cm$^{-1}$.

EXAMPLE 2

Preparation of Octadecenylsuccinic Anhydride (ODSA)

One thousand and eight grams (4.0 moles) of 1-octadecene and 490 grams (5.0 moles) of maleic anhydride were placed in a 2 liter stirred autoclave equipped with a thermocouple. The reaction was carried out by heating the mixture at 200° C. for 4 hours, and the cooled product was transferred to a 2 liter round bottom flask equipped with a magnetic stir bar, a thermometer, and a distilling head mounted on a Vigreux Column. Unreacted starting materials were removed at 200° C. and 10 torr, leaving the product ODSA (750 grams) in the pot. It was typically a tan solid (m.p. 40°–55° C.) with strong adsorption in its IR spectrum at 1860 and 1785 cm$^{-1}$.

EXAMPLE 3

This example, summarized in Table 1 below, shows a comparison of property modification using compounds of the present invention and the compounds currently used commercially as coupling agents for $CaCO_3$ in low density polyethylene. The compound of the invention used was dodecenylsuccinic anhydride which was prepared as set forth in example above. Four formulations were prepared using the same type of polyethylene and were compared to a sample of the unfilled polyethylene. Each of the four samples contained 60 parts by weight of low density polyethylene (NA 208, a trademark of U.S. Industrial Chemicals Co.), 40 parts calcium carbonate filler having an average particle size of about 2.5 microns (Microwhite 25, a trademark of Sylacauga Calcium Products), and one percent of the indicated coupling agent based on the weight of the filler. Each sample was extruded twice and injection molded. In composition 1, the calcium carbonate received no pretreatment. In composition 2, the calcium carbonate was pretreated with stearic acid. In composition 3, the calcium carbonate was pretreated with a commercially available titanate (KR-TTS, a trademark of Kenrich Petrochemicals, Inc.). In composition 4, the calcium carbonate filler was pretreated with a substituted succinic anhydride of the invention. Results for the unfilled resin are also provided in Table 1.

TABLE I

| | Unfilled | Composition No. | | | |
| --- | --- | --- | --- | --- | --- |
| | | 1 | 2 | 3 | 4 |
| Tensile Strength (psi) | 1530 ± 40 | 1570 ± 30 | 1450 ± 10 | 1470 ± 10 | 1420 ± 10 |
| Elongation at Break (%) | 166 ± 31 | 17 ± 2 | 39 ± 14 | 22 ± 2 | 36 ± 9 |
| Impact Strength (ft.-lb./in.) | | 1.1 ± .3 | 2.7 ± .6 | 2.2 ± .2 | 2.5 ± .2 |
| Flexural Modules ($\times 10^4$ psi) | 2.2 ± .5 | 5.8 ± .3 | 5.4 ± .3 | 5.3 ± .3 | 5.3 ± .3 |

Within experimental error all of the coupling agents provided filled products that were comparable in tensile strength, percent elongation, impact strength and flexural modulus.

EXAMPLE 4

In this example, the results of which are summarized in Table II, the effectiveness of a number of coupling agents and other dispersants to disperse 25 grams of coated calcium carbonate particles having an average particle size of about 2.5 microns (Microwhite 25, a trademark of Sylacauga Calcium Products) in 50 grams of paraffin oil (viscosity of 58 cps) by mixing at 20° C. with a Hamilton Beach mixer was determined. This test provides a means of determining the effectiveness of a coupling agent in improving the dispersion of inorganic materials in an organic medium. In each instance one percent coupling agent was employed. In trials 12, 13, 16 and 18 coupling agents according to the present invention were employed. As Table II indicates, the most effective dispersants were dodecenylsuccinic anhydride (DDSA) and octodecenylsuccinic anhydride (ODSA). The ability of an agent to disperse the inorganic particles in an organic medium may be a desirable function of a coupling agent especially where the inorganic particles are not easily dispersed in the absence of such agents.

TABLE II

| Trial No. | Dispersing or Coupling Agent (1%) | Viscosity (cps) |
| --- | --- | --- |
| 1. | None | 97,000 |
| 2. | Surfaid 79[a] | 26,500 |
| 3. | $CF_3CO_2H$ | 8,750 |
| 4. | Dibenzo-18-crown-6 | 4,050 |
| 5. | $C_7F_{15}CO_2H$ | 2,600 |
| 6. | Dibenzo-18-crown-6 + 0.5% acetic acid | 2,050 |
| 7. | Tween 60 | 1,800 |
| 8. | Acetic acid (0.5%) | 1,750 |
| 9. | VP 900[b] | 1,725 |
| 10. | Chromium complex (Quilon C)[c] | 988 |
| 11. | VP 905[b] | 625 |
| 12. | (chlorinated bicyclic anhydride structure) | 575 |
| 13. | (cyclohexane dianhydride structure) | 525 |
| 14. | Stearic Acid | 328 |
| 15. | Titanate (KR-TTS)[d] | 271 |
| 16. | ODSA | 259 |
| 17. | Lecithin | 138 |
| 18. | DDSA | 100 |

[a]NL Industries
[b]Byk - Mallinckrodt Chemische
[c]E. I. DuPont de Nemours & Co.
[d]Kenrich Petrochemicals Inc.

EXAMPLE 5

Example 4 was repeated using different fillers, i.e. Wollastonite, alumina trihydrate, and barium sulfate dispersed in paraffin oil and similar viscosity data was observed.

EXAMPLE 6

In this example the inorganic filler was precoated and dispersed in a polyol resin useful in making polyurethane foams. In each trial 50 grams of Wollastonite (Nyad 400, a trademark of NYCO Co.) was precoated with the coating indicated in column 2 of Table 3. The amount of coating is indicated in column 3 as percent based on the weight of filler. The organic medium was 50 grams of a polyol resin (Pluracol 381, a trademark of Union Carbide Corp.) and the mixing was accomplished using a Hamilton Beach Blender. Viscosity data is provided both before and after the addition of 1.1 milliliters of water (blowing agent) and again dodecenylsuccinic anhydride produced the lowest viscosity indicating excellent dispersion of the filler. As the example indicates, this viscosity reduction may be especially important in reinforced reaction injection molding (RRIM) applications.

TABLE III

| Trial | Coating | % Loading | Initial Viscosity (cps) | Viscosity After H2O Addition |
|---|---|---|---|---|
| 1. | None | — | 3,250 | 40,750 |
| 2. | Stearic Acid | 1.0 | 5,750 | 20,750 |
| 3. | Titanate (KR-TTS)** | 0.5 | 4,000 | 4,750 |
| 4. | Lecithin | 1.0 | 3,800 | 7,650 |
| 5. | Lecithin | 0.5 | 2,000 | 4,450 |
| 6. | Silane (A-174)* | 0.5 | 2,150 | 1,900 |
| 7. | Silane (A-1100)* | 0.5 | 2,100 | 9,250 |
| 8. | Titanate (KR-55)** | 0.5 | 2,100 | 4,250 |
| 9. | Polymeric ester*** (W-900) | 0.5 | 1,650 | 8,250 |
| 10. | Titanate (KR-138)** | 0.5 | 1,650 | 3,400 |
| 11. | DDSA | 0.5 | 1,900 | 1,700 |
| 12. | DDSA | 1.0 | 1,250 | 1,550 |

*Union Carbide Corp.
**Kenrich Petrochemicals Inc.
***Byk-Mailinckrodt Chemische

What is claimed is:

1. A filled polymeric composition which comprises a natural or synthetic polymer containing therein a filler treated with a substituted succinic anhydride.

2. The composition of claim 1, wherein said substituted succinic anhydride is one having the formula:

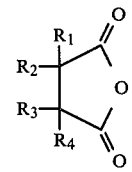

wherein at least one of $R_1$, $R_2$, $R_3$ and $R_4$ is a substituent selected from alkyl, alkenyl, alkynyl or aralkyl group having from 1 to about 30 carbon atoms or a substituted derivative thereof, and the remaining substituents are hydrogens.

3. The composition of claim 2, wherein said radical has from 1 to 10 substitutions including halogen, tertiary amino, tertiary amide, ketal, episulfide, sulfonate, phosphonate, imide, carboxylate, carbonate, isocyanate, silane, epoxy, cyano, ether, thioether, carbonyl, aromatic nitro, and acetal.

4. The composition of matter of claim 1, wherein said comminuted inorganic material is a filler which is a metal, metal oxide, carbon black, sulfur, calcium carbonate, silica or clay.

5. The composition of claim 4, wherein said metal oxide is zinc oxide, magnesium oxide, titanium oxide, yellow iron oxide, calcium oxide or lead oxide.

* * * * *